3,066,120
HOMOPOLYMER OF 1-PHENYLVINYL ACETATE AND METHOD OF PRODUCING IT

James A. Snelgrove, West Springfield, Mass., assignor to Shawinigan Resins Corporation, Springfield, Mass., a corporation of Massachusetts
No Drawing. Filed Aug. 7, 1958, Ser. No. 753,648
3 Claims. (Cl. 260—89.1)

This invention relates to a new composition of matter, namely, a homopolymer of 1-phenylvinyl acetate, and a method of producing it.

Among the objects of the invention is that of broadening the field of synthetic resins available for use in the preparation of adhesive, insulating and other coating compounds and molding compounds.

A further object is to provide a method by which 1-phenylvinyl acetate may be homopolymerized to provide a polymeric material for the above and similar purposes.

I have found that monomeric 1-phenylvinyl acetate when placed in a diffused condition as in a solution, or a liquid suspension or dispersion and subjected to heat in the presence of a suitable initiator under prescribed conditions, will polymerize to solid form.

More specifically I have found that if monomeric 1-phenylvinyl acetate is dissolved in a suitable solvent, the solution refluxed, or heated under nitrogen for a suitable period, in the presence of an organic peroxide initiator, that a polymeric 1-phenylvinyl acetate of various molecular weights, as measured by its intrinsic viscosity in benzene at 20° C., is recovered.

I have also found that when a suspension of 1-phenylvinyl acetate in water is formed, using a suitable suspension agent, and the suspension agitated under reflux in the presence of an organic peroxide initiator, a polymeric 1-phenylvinyl acetate is recovered.

While some reference is found in the chemical literature to the copolymerization of 1-phenylvinyl acetate with acrylonitrile, as far as I am aware it has not hitherto been found possible to prepare a true homopolymer of this monomer.

The homopolymer of 1-phenylvinyl acetate has special utility as a higher temperature stable form of a vinyl acetate polymer. Whereas the homopolymer of vinyl acetate undergoes thermal degradation by means of oxidation at elevated temperatures the substitution of the phenyl group in the monomer molecule for the more reactive hydrogen atom increases the temperature stability of the derivative homopolymer.

A better understanding of the nature of the present invention can be obtained by reference to the following examples. It is to be understood that these examples are merely illustrative of the present invention and are not to be considered as limitative of the scope thereof. Where parts are mentioned, they are parts by weight.

Example I

When 100 parts of this monomer, 200 parts benzene and 0.370 part acetyl peroxide (measured as $NaBO_3$, $4H_2O$) were refluxed for 23 hours, a 75% yield of polymer was obtained. The polymer was separated from the reaction medium by conventional steam distillation means. The intrinsic viscosity of the polymer in benzene at 20° C. was 0.110.

Example II

When 100 parts of monomer, 133 parts of benzene and 1 part of lauroyl peroxide were heated at about 80° C. under nitrogen for about 22 hours, a yield of about 13% of a light yellow colored polymer of intrinsic viscosity in benzene at 20° C. of 0.029 was obtained. The separation of the polymer from the reaction medium was again achieved, as in Example I, by conventional steam distillation wherein the unreacted monomer together with the other constituents of the reaction medium are distilled off leaving behind the polymer product.

Example III

When 100 parts of monomer, 200 parts of water, 0.05 part of a polyvinyl alcohol dispersing agent and 0.5 part of benzoyl peroxide were vigorously agitated and refluxed for about 22½ hours, a yield of 6% of a yellowish polymer which was insoluble in benzene alone was obtained. Its intrinsic viscosity at 20° C. in a mixture of 2 parts benzene and 1 part acetone by volume was 0.312.

Although 1-phenylvinyl acetate is the preferred monomer for the practice of this invention, certain substituted compounds of 1-phenylvinyl acetate are suitable monomers in that such substituted compounds can similarly be homopolymerized to yield a polymeric material which is suitable for use as adhesives, surface coatings, molding compounds and other uses. Those substituted compounds of 1-phenylvinyl acetate having small additive groups attached to the benzene ring as typified by methyl and ethyl groups, the halogen, nitrate, sulfonate groups and others may be homopolymerized. The limiting factor to the suitability of such a substituent is that it be sufficiently small in size so as not to sterically hinder the polymerization reaction. Likewise, other substituted compounds of 1-phenylvinyl acetate comprising those having a substitute atom or atoms present in the acetoxy group of the molecule are suitable and can be homopolymerized. These latter substituents can be limited to substitute atoms or groups of atoms for the hydrogen atoms in the acetoxy radical. Such suitable substitute atoms or groups of atoms include the amino, cyano, halo, and hydroxy groups and their suitability is again limited to those sufficiently small in size so as not to sterically hinder the polymerization reaction.

As illustrated in the preceding examples, more than one method of polymerization can be used to practice the present invention. Any of the conventional methods of polymerization such as the solution polymerization method demonstrated in Examples 1 and 2 heretofore or the granular polymerization method used in Example 3 are satisfactory to produce the homopolymer of 1-phenylvinyl acetate.

Nor is the invention limited to the particular materials in the polymerization systems used with the polymerization methods shown in the examples. In the solution polymerization method examples benzene was employed because it was both an inert solvent for the monomer and the polymer. Substitute solvents for the benzene can be selected from liquid aryl hydrocarbons and derivatives thereof typical of which are xylene, toluene and others.

Other dispersing agents can be substituted for the polyvinyl alcohol used in Example 3. Suitable hydrophilic colloids which may be substituted for the polyvinyl alcohol used in the granular polymerization method illustrated therein include partially hydrolyzed polyvinyl acetate, for example polyvinyl alcohol containing up to 40% acetate groups. Other suitable colloids are soluble starch, soluble starch degradation products, the methyl ether of cellulose, water soluble glycol cellulose, gum tragacanth, gum acacia, sodium alginate, agar-agar, gum tragon, gum arabic, glue, gelatine, hydroxy ethyl cellulose, sodium carboxy methyl cellulose, vinyl acetate-maleic anhydride copolymer and the like.

Other polymerizing temperatures may be used, the exact temperature depending in part upon the nature of the polymer desired and on the volatility of the materials used. When necessary to avoid escape of volatile materials, the polymerization may be carried out under pressure in a closed system. However temperatures between 60°–100° C. are usually employed with the upper temperature reserved for aqueous emulsion polymerization systems.

Various compounds in the class of free radical initiators can be substituted for the peroxide polymerization initiators used in the preceding examples. A limiting feature for a solution polymerization initiator is that it obviously be soluble in the particular solvent used. On the other hand, it is also desirable that the initiator also be soluble in the emulsion polymerization method. Various water soluble per compounds may be used in place of the peroxides employed in Example 3, such as peracetic acid, sodium perborate, potassium perborate, sodium persulfate, and potassium persulfate. Other peroxides can be substituted for those used in the preceding examples, subject to the limitations already imposed regarding initiators, including sodium peroxide, potassium peroxide, oleyl peroxide, urea peroxide and the like.

In addition to the various applications for which this composition is particularly suitable as hereinbefore described, it will be obvious to the man skilled in the art that not only other applications are apparent but that modifications of the composition and variations in the processes shown for the preparation of the composition are likewise within the scope of this invention.

What is claimed is:

1. The method of preparing a solid homopolymer of 1-phenylvinyl acetate which comprises forming a solution of the monomer in benzene with acetyl peroxide as an initiator, in the proportion of 100 parts monomer, 200 parts benzene and 0.480 part acetyl peroxide and refluxing the mixture at a temperature of 90° C. for a period of approximately 23 hours.

2. The method of preparing a solid homopolymer of 1-phenylvinyl acetate which comprises forming a solution of the monomer in benzene with lauroyl peroxide as an initiator, in the proportion of 100 parts monomer, 133 parts benzene and 1 part lauroyl peroxide, and heating the mixture under nitrogen, at a temperature of approximately 80° C. for a period of approximately 22 hours.

3. The method of preparing a solid homopolymer of 1-phenylvinyl acetate which comprises forming a dispersion of the monomer in water with polyvinyl alcohol as a dispersing agent and benzoyl peroxide as an initiator in the proportion of 100 parts monomer, 200 parts water, 0.05 part polyvinyl alcohol and 0.5 part benzoyl peroxide, and vigorously agitating the mixture under reflux conditions at a temperature of approximately 100° C. for a period of approximately 22½ hours.

References Cited in the file of this patent

UNITED STATES PATENTS

| | | |
|---|---|---|
| 2,466,737 | Quattlebaum et al. | Apr. 12, 1949 |
| 2,467,095 | Quattlebaum et al. | Apr. 12, 1949 |
| 2,511,423 | Young | June 13, 1950 |

OTHER REFERENCES

Hart et al., Journal of Polymer Science, vol. 5 (1950), pp. 55–67.

Gaylord et al., Journal of Polymer Science, vol. 5 (1950), pp. 743–44.

Chapin et al., Jour. of Polymer Sci., vol. 4 (1949), pp. 597–604.

Marvel et al., J. Amer. Chem. Soc., vol. 62, 1940, pp. 45, 46, 48 and 49.